United States Patent [19]
Farahat

[11] Patent Number: 5,961,568
[45] Date of Patent: Oct. 5, 1999

[54] COOPERATIVE RESOLUTION OF AIR TRAFFIC CONFLICTS

[76] Inventor: Ayman Farahat, #5, 2295 West First Avenue, Vancouver, British Columbia, Canada, V6K2

[21] Appl. No.: 08/888,561

[22] Filed: Jul. 1, 1997

[51] Int. Cl.[6] .................................................... G06F 19/00
[52] U.S. Cl. .............................. 701/120; 701/13; 701/14; 701/226; 701/301; 342/29
[58] Field of Search ................................. 701/11, 13, 14, 701/15, 16, 3, 120, 301, 226; 342/29, 30, 36, 357, 454, 456, 357.01, 357.02, 357.03, 357.04; 244/75 R, 178 R

[56] References Cited

U.S. PATENT DOCUMENTS

| | | | |
|---|---|---|---|
| 4,196,474 | 4/1980 | Buchanan et al. | 396/280 |
| 4,839,658 | 6/1989 | Kathol et al. | 701/301 |
| 5,099,245 | 3/1992 | Sagey | 342/357 |
| 5,111,400 | 5/1992 | Yoder | 701/301 |
| 5,714,948 | 2/1998 | Farmakis et al. | 701/120 |

*Primary Examiner*—William A. Cuchlinski, Jr.
*Assistant Examiner*—Gertrude Arthur
*Attorney, Agent, or Firm*—Georgann Grunebach; William Schubert; Leonard Alkov

[57] ABSTRACT

A system and computer-implemented conflict resolution method for resolving air traffic conflicts involving a plurality of aircraft. The system may comprise an air traffic control system having a computer that implements a conflict resolution method, and a radar coupled to the traffic control system that provides position and velocity information for each aircraft. A communication subnetwork is used to communicate between aircraft and the traffic control system. Each aircraft may have a computer that implements the conflict resolution method, and a data link for transferring position and velocity information between the aircraft and the traffic control system over the communication subnetwork. Thus, either the aircraft, or the air traffic control system, or both implement the present method. The conflict resolution method in each aircraft and traffic control system cooperate to process position and velocity information relating to each aircraft to generate a series of conflict-free maneuvers for each aircraft that optimize the flight path of each respective aircraft toward their respective destinations while eliminating or minimizing the possibility of interference between the aircraft.

5 Claims, 2 Drawing Sheets

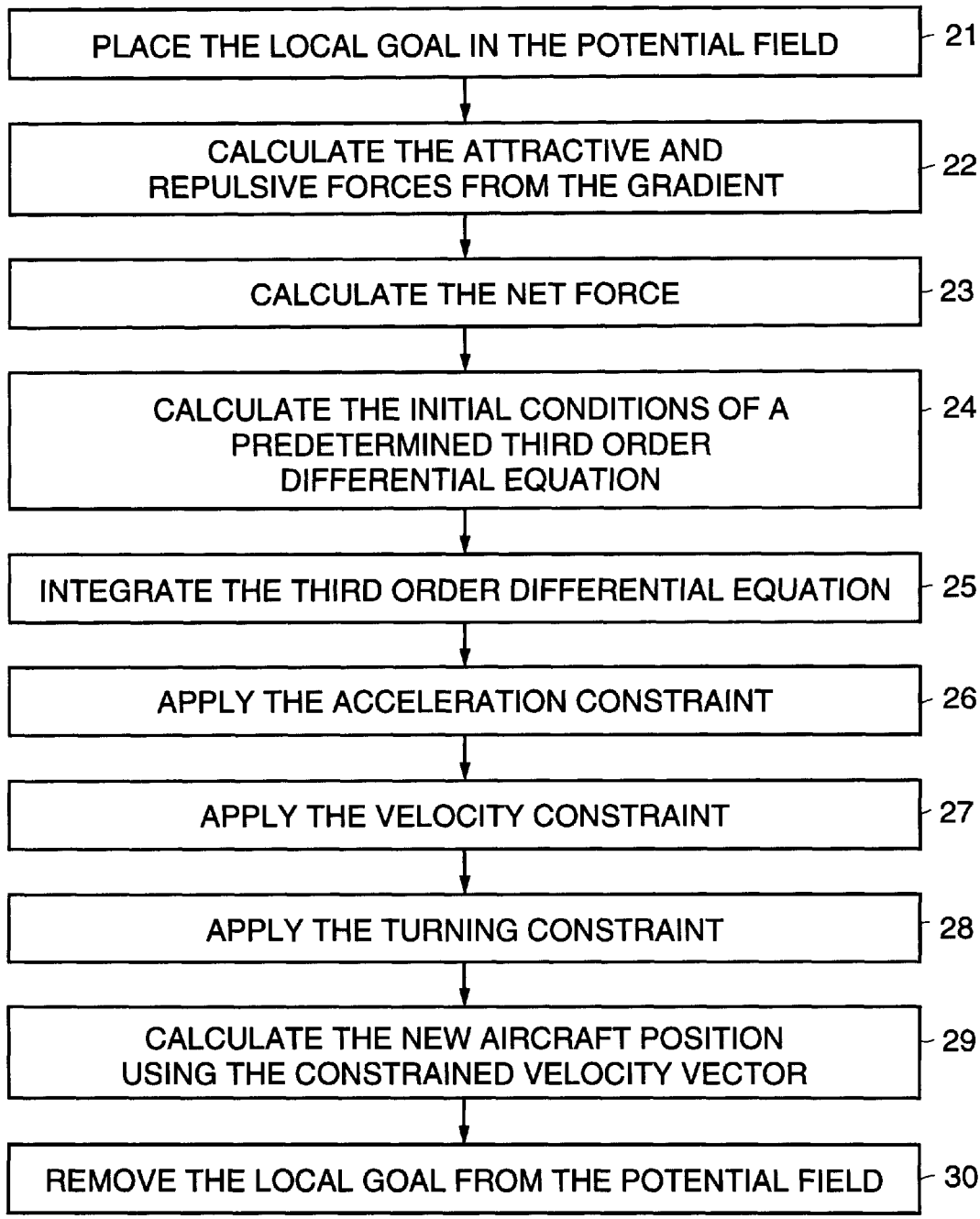

COOPERATIVE RESOLUTION OF AIR TRAFFIC CONFLICTS

BACKGROUND

The present invention relates generally to computerized processing methods and systems, and more particularly, to a system and computer-implemented algorithm or method for resolving air traffic conflicts.

The currently used air traffic control system has reached its capacity. Between overworked controllers and antiquated patchwork equipment, the ability to manage increasingly congested airways has become the subject of valid scrutiny. Compounding that concern, it is estimated that passenger traffic is growing by seven percent per year, and that the commercial airline fleet will double in size by the year 2007. The overhaul process, a worldwide effort, has started. One of the cornerstones of the next generation of air traffic is a free flight concept.

The free flight concept promises to revolutionize air navigation. Currently, air navigation is based on waypoints, which are fixed beacons that define an airway. The aircraft is guided to its destination using a sequence of such airways. Controllers are responsible for monitoring these aircraft and assuring that each maintains a defined amount of separation from its closest neighbor. Controllers determine the probability that this separation will be violated, determine that a conflict is present, and then issue altitude, heading or velocity changes if necessary.

Free flight refers to aircraft flying optimal routes, rather than using the airways. Navigation for free flight aircraft uses the satellite-based Global Navigation Satellite Service rather than radar. The benefits of free flight are many. Among the most frequently cited benefits are reduced flight times and improved fuel efficiency for aircraft. Pilots will be granted the freedom to select routes that maximize performance capabilities of their aircraft and the nature of the flight. The greatest benefit may be that of increased airspace capacity. Ending the current restriction of traffic to airway space, particularly in areas of no radar coverage, will decimate traffic density, allowing the expected growth in air traffic to occur without an increase in congestion.

Despite the slashing of traffic density, aircraft conflict probabilities will never be zero, and therefore the need for conflict resolution services will persist after the introduction of free flight. Although conflict may arise less frequently, the additional freedom awarded to aircraft will make the conflicts that do occur more complex and controllers will no longer be able to rely on the structure of airways in determining resolutions. In addition, it is possible that a large number of aircraft will be affected by the outcome of the resolution leading to a large "ripple effect". One solution is the use of automated conflict resolution systems.

Automated tools that aid in the resolution of conflicts have been developed, and one of the most prominent systems is the Traffic Alert and Collision Avoidance System (TCAS). Required for flight within U.S. airspace and used worldwide, the on-board TCAS of each aircraft receives position and velocity transmissions from neighboring aircraft, then uses track vectors to determine collision risk. New versions of TCAS determine and suggest avoidance maneuvers to the pilot of an aircraft projected to lose separation.

While TCAS is an effective system, using technology developed for free flight, such as the Global Navigation Satellite Service and data links, it would be desirable to have a more sophisticated automatic collision avoidance system for use with free flight aircraft. Because the Global Navigation Satellite Service provides for a multiple-sensor navigation system and data link, it allows precise tracking of all aircraft in a region of airspace, therefore it would be desirable to have an on-board, reactive, self-organizational conflict resolution system for use with free flight aircraft.

In general, prior approaches to resolve air traffic conflicts in the context of free flight used expert systems and rule based systems. The disadvantages of these systems are their computational complexity, and the fact that rules used therein are not complete, in that, what to do in case that a situation not covered by the rules is encountered cannot be resolved.

Accordingly, it is an objective of the present invention to provide for a system and computer-implemented algorithm or method for resolving air traffic conflicts in the context of free flight.

SUMMARY OF THE INVENTION

To meet the above and other objectives, the present invention provides for a system and a computer-implemented conflict resolution algorithm or method specifically designed to resolve air traffic conflicts in the context of free flight.

In the present method, the following steps are performed for each time step, and for each aircraft. A local goal position is placed in a potential field associated with the aircraft. Attractive and repulsive forces are calculated from the gradient of the potential field. The net force is calculated using the calculated attractive and repulsive forces. Initial conditions of a predetermined third-order differential equation are calculated that defines the motion of the aircraft. The third-order differential equation is integrated to compute velocity and acceleration vectors for the aircraft. The acceleration constraint is applied to the acceleration vector. The velocity constraint is applied to the velocity vector. The turning constraint is applied to the velocity vector. A new aircraft position is calculated using the constrained velocity vector. The local goal position is then removed from the potential field.

The present invention works in a situation involving hundreds of aircraft, and is not an exponential function of the number of aircraft that are processed. The present invention also considers the fact that aircraft should travel along smooth trajectories. The present invention is also reactive, in that it can handle sudden and unexpected changes in an air traffic situation, such as the case of an aircraft or any unexpected obstacle suddenly appearing. The present invention also provides for a multi-stage resolution, where trajectories of one stage of a flight are optimized and smoothed in the next stage. The present invention resolves large scale conflict problems in real time, and may be used with any endeavor that requires motion planning, such as for submarines, autonomous vehicles, and other means of transportation.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 illustrates a computer-implemented conflict resolution method in accordance with the principles of the present invention employed using the system of FIG. 1.

DETAILED DESCRIPTION

Figure 1:
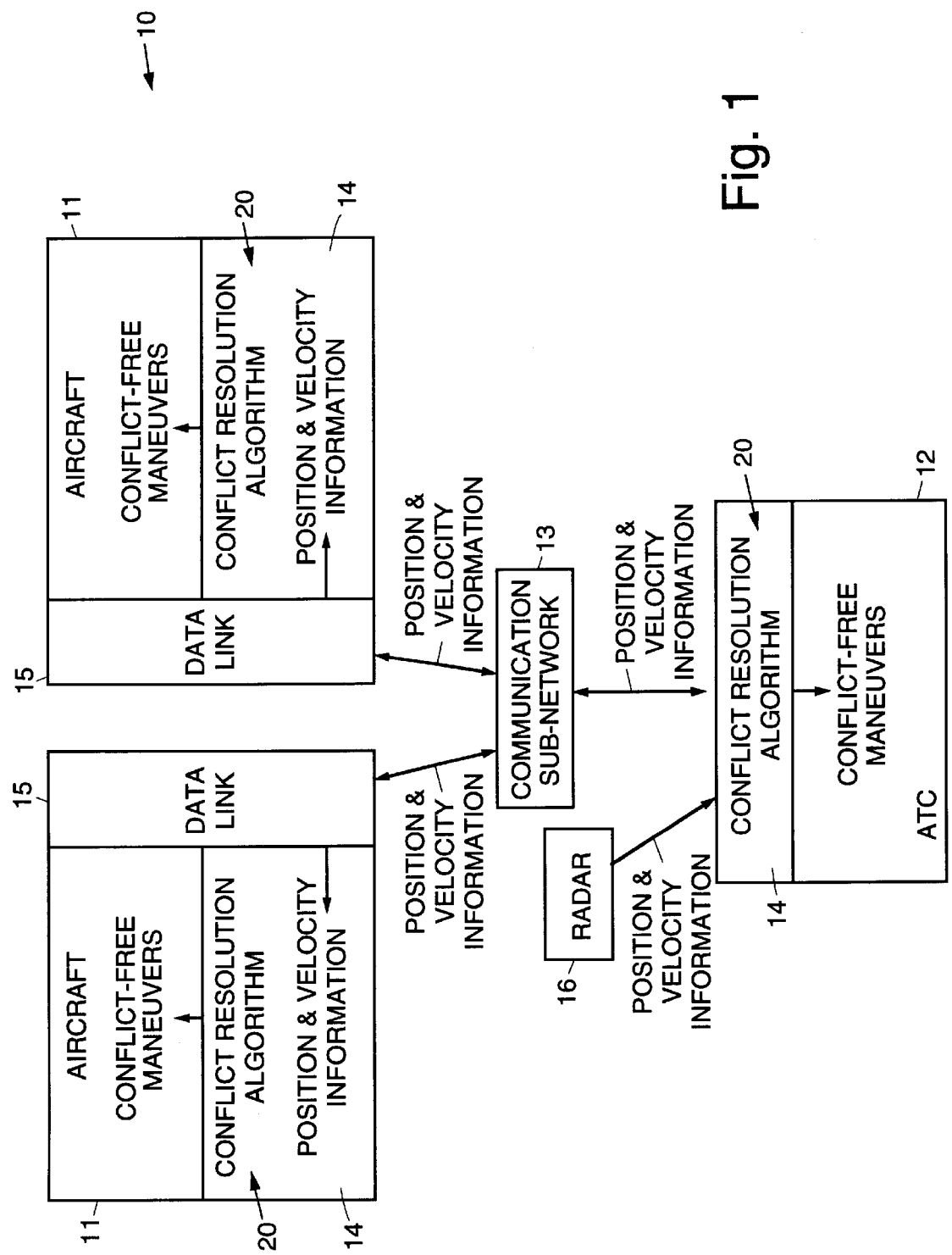
FIG. 1 illustrates a system implemented in accordance with the principles of the present invention.

Referring to the drawing figures, FIG. 1 illustrates a system 10 implemented in accordance with the principles of the present invention. The problem of air traffic conflict resolution can be simplified into a single statement. Aircraft 11 seek a goal position, while maintaining separation from positions occupied by other aircraft 11. An effective conflict resolution system 10 and method 20 (discussed with reference to FIG. 2) provides a means to distinguish positions that the aircraft 11 should seek from those which it should avoid and guide the motion of the aircraft 11 accordingly. A potential field method is therefore highly suitable for modeling the air traffic conflict resolution problem, and is the basis of the present invention.

Using the potential field method, the opposing elements of goal positions and occupied positions are modeled as charges of opposite polarity. Placement of these charges forms a potential field. The gradient of this potential field at a given point represents the direction and magnitude of force exerted on a positive charge placed at that point. As a result of such forces, positive charges placed in the field move to positions of minimum potential, the positions that maximize distance from other positive charges and minimize distance to negative charges. The present invention models the air traffic conflict problem by representing positions of the aircraft 11 as positive charges and goal positions as negative charges.

The objective of the present invention is to provide a system 10 and method 20 that resolves air traffic conflicts in a manner that ensures a safe separation distance between aircraft 11 at all times. For the purposes of example, five nautical miles is considered a safe separation distance.

Obstacles are also modeled as positive charges. Aircraft 11 are each represented by a single positive point charge, but positive charges may also be grouped to represent static obstacle regions such as restricted airspace, mountains, or hazardous weather. For a single positive charge, the potential at distance d is given by:

$$U = k_{repulse}(1/d - 1/d_{influence})^2$$

where $k_{repulse}$ is a positive scaling factor and $d_{influence}$ is a distance of influence parameter.

The repulsive force exerted by an obstacle is greatest when the distance to the obstacle is small and will fall to a small, but non-zero, value at great distances. Distant aircraft 11 pose no immediate threat, and the repulsive forces due to aircraft 11 located beyond a predefined radius, the distance of influence, are disregarded. A small distance of influence value reduces unnecessary deviation from an optimal path, and thus improves goal-reaching performance. A large distance of influence value provides increased separation between aircraft 11. The distance of influence was selected to be four times the minimum separation distance, or twenty nautical miles. For simplicity, the value of $k_{repulse}$ was selected to be 1.0.

Potential, and therefore repulsive force, due to a positive charge increases as distance decreases, for all distances. There is no limit to the magnitude of potential due to an obstacle.

The goal position is modeled as a negative charge. There is only one negative charge per aircraft 11 in the field at all times. For a single negative charge, the potential due to that charge at distance d is given by:

$$U = K_{attract} d^2$$

where $k_{attract}$ is a positive scaling factor.

At large distances, the attractive force due to this negative charge is great, sufficiently large to outweigh the repulsive force due to other obstacles. To maximize the effect of repulsive forces, it is important that the aircraft 11 be very close to its goal position at all times. To meet this condition, a charge corresponding to a local goal position, rather than the ultimate goal position (or destination) of the aircraft 11, is introduced into the potential field. The local goal position, $p_{local}$ is offset from the current position of the aircraft 11, $p_{current}$, by a distance and direction required for the aircraft 11 to arrive at that ultimate goal position, $p_{goal}$, at the optimal time.

$$p_{local} = p_{current} + (p_{goal} - p_{current})/(t_{goal} - t_{current})$$

where $t_{goal}$ is the time at which the aircraft is due at the ultimate goal position, and $t_{current}$ is the current time.

Forces are computed from the potential field model by numerically approximating the gradient at the point of interest (the current position of the aircraft 11) using a divided difference method. The component of this force due to the charge associated with the goal position is also calculated to separate attractive and repulsive forces from the total force. To provide conflict resolution, it is necessary to introduce force components in addition to attractive and repulsive forces.

To resolve conflicts, it is important that the aircraft 11 have a default direction of motion. Therefore, a force normal to the repulsive force is introduced and is given by:

$$f_{repulsive} = [x\ y]$$

$$f_{repulsive\ normal} = [y\ -x]$$

It is also important the provide the ability to recognize that a conflict threat is increasing, and thus the derivative of the repulsive force is introduced. A force normal to this derivative is also computed. These two derivative forces are scaled by a factor of two to increase their effect.

The five above-defined components: attractive, repulsive, repulsive normal, repulsive derivative, and repulsive derivative normal, are summed to produce a single composite force. The motion of the aircraft 11 is governed by this composite force which is defined by the following third-order differential equation:

$$a\ d^3\vec{p}/dt^3 + b\ d^2\vec{p}/dt^2 + c\ d\vec{p}/dt = \vec{f}$$

$$a = 1.0,\ b = 0.6,\ c = 0.1 \qquad (*)$$

where f is the sum of forces, and p is the position vector of the aircraft 11. Coefficients a, b, and c are selected to optimize the computational response time. The system 10 and method 20 implemented using the above differential equation is stable for these coefficients, and bounded inputs yield bounded outputs.

In the absence of obstacles, the motion of the aircraft 11 is stable, tending to the optimal velocity, at which any acceleration ceases. The optimal velocity for the aircraft 11 is the velocity that causes ultimate goal achievement at the designated time. For this equilibrium, the equation of motion reduces to $$d\vec{p}/dt = f$$

$$c = 0.1$$

where dp/dt is the optimal velocity of the aircraft 11. Without repulsive components, the magnitude of force f is linear with the coefficient $k_{repulse}$, and this value was selected to be 0.05 to satisfy this reduced equation. Selection of a value that is very small relative to the value of $k_{repulse}$ also emphasizes the priority placed on separation over local goal adherence.

The motion that is found by integrating the above third-order differential equation is checked for consistency with capabilities of the aircraft 11. Acceleration and velocity magnitudes are limited to predefined ranges to ensure realistic motion of the aircraft 11. Aircraft motion is subject to non-holonomic constraints, is limited with regard to possible differential motions, and directional changes are also regulated.

The integration of the above third-order differential equation promotes smooth changes in motion of the aircraft 11, but non-smooth characteristics may be introduced by imposing desired constraints. To encourage smooth changes, each solution vector is multiplied by a coefficient. This coefficient, k, is defined by as follows:

$$k = \begin{cases} x & x \leq 0.617447 \\ \text{erf}(x) & x > 0.617447 \end{cases}$$

where x is the ratio of the length of the solution vector and the maximum length of the solution vector, and elf is the error function. The error function has an upper bound of one and provides near-linear properties for operands close to zero. The function is defined as given above because $x=0.617447$ is a value that satisfies the equality:

$$x = \text{erf}(x).$$

Using this coefficient, the solution vector may be smoothly scaled into a range between zero and one. This value is interpreted and the ratio of the full scale magnitude. For large ratios, specifically those well in excess of unity, the acceleration vector is scaled to maximum value.

The magnitude of acceleration is constrained to 1.0 g m/s². This acceleration constraint is imposed on the solution acceleration greater than the maximum acceleration by the following function:

$$\vec{a} = k a (\vec{a}_{maximum} / |\vec{a}|)$$

where $a_{maximum}$ is the magnitude of the acceleration constraint. This scaled value is then integrated over the time interval to evaluate the new velocity. Velocity is constrained to be within five percent of the ideal velocity. To use the desirable scaling properties of the error function, the allowable range must be from zero to some value. To meet this requirement, the difference between the solution velocity, $v_{difference}$ and the optimal velocity, $v_{optimal}$ is scaled, given by:

$$\vec{v} = v_{optimal} + k \vec{v}_{difference}(v_{difference\ maximum} / |v_{difference}|)$$

where $v_{difference}$ maximum is the magnitude of the velocity constraint.

The local goal position is also subjected to this velocity constraint. If the goal motion is outside the permitted range, it is cropped so that it does not lag the minimum nor exceed the maximum velocity. This limits the distance from the aircraft 11 to the goal position, implicitly restricting the magnitude of attractive force. The local goal position represents the average step required for on-time arrival at the ultimate goal position, and enforcement of a velocity constraint effectively causes the aircraft 11 to have either an early or late arrival.

The above velocity vector is then compared to the previous velocity vector to ensure that the directional constraint is not violated. Turning motion is limited so that the force due to turning does not exceed 1.0 g m/s². If adherence to the velocity vector requires a directional change outside the defined limits, the vector direction change is set to the maximum that is allowable. The magnitude of the velocity vector is not altered. This final velocity is then integrated over the time step to evaluate the new position.

Referring now to the FIG. 1, it illustrates an exemplary embodiment of the present system 10. The system 10 shown in FIG. 1 shows two aircraft 11 that communicate with an air traffic control system (ATC) 12 by means of a communication subnetwork 13. Each aircraft 11 has a computer 14 that implements the present method 20 or algorithm 20, and a data link 15 that transfers position and velocity information between the aircraft 11 and the ATC 12 over the communication subnetwork 13. A radar 16 is coupled to the ATC 12 and provides position and velocity information to the ATC 12 for each aircraft 11 in the vicinity of and under control of the ATC 12. The ATC 12 also has a computer 14 that implements the present method 20 or algorithm 20.

The conflict resolution method 20 or algorithm 20 implemented in each aircraft 11 and in the ATC 12 cooperate to process position and velocity information relating to each aircraft 11 to generate a series of conflict-free maneuvers for each aircraft 11 that optimize the flight path of each respective aircraft 11 toward their respective goal positions while eliminating or minimizing the possibility of interference between the respective aircraft. The specific methodology implemented by the present conflict resolution method 20 or algorithm 20 will now be described.

Referring now to the FIG. 2, it illustrates steps of one embodiment of the computer-implemented conflict resolution method 20 in accordance with the principles of the present invention and which is implemented in the present system 10. The system 10 may be implemented using the following algorithm 20 or method 20, in view of the definitions discussed above.

For each time step, and for each aircraft 11, the following operations are performed. A local goal position for the aircraft 11 is placed 21 in a potential field associated with the aircraft. The word "place" refers to locating a goal on a map, which represents the next goal destination of the aircraft 11.

Attractive and repulsive forces are calculated 22 from the gradient of the potential field. A net force is calculated 23 using the calculated attractive and repulsive forces. Initial conditions of a predetermined third-order differential equation that defines the motion of the aircraft 11 are calculated 24.

The third-order differential equation is integrated 25 to compute a velocity vector for the aircraft 11. An acceleration constraint is applied 26 to the acceleration vector. A velocity constraint is applied 27 to the velocity vector. A turning constraint is applied 28 to the velocity vector. A new aircraft position is calculated 29 using the constrained velocity vector. The local goal position is removed 30 from the potential field. Each aircraft 11 simultaneously uses its unique potential field to guide its motion. There is no element of anticipation, and the behavior of the aircraft 11 is purely reactive.

A series of tests were devised to test the performance of the system 10 and method 20. For simplicity, all tests are performed in two dimensions, not three. Neglecting the third dimension, an additional degree of freedom, also provides a more rigorous test of the capabilities of the system 10 and method 20. Most test scenarios were simulated on a twenty-four nautical mile by twenty-four nautical mile grid. The center of this grid was referred to as the point (12.0, 12.0). The optimal speed of most aircraft 11 were set to two hundred nautical miles an hour. For tests that involved aircraft 11 moving at different speeds, it was the speed of the aircraft 11 of greatest interest that was set to this value.

The ultimate goal position of each aircraft 11 was surrounded by a capture zone, and the aircraft 11 was considered to have arrived when it was within this capture zone. The capture zones were one-tenth of the minimum separation distance, or one half nautical mile, in radius. The repulsive force due to all aircraft 11 was determined at the starting point of each aircraft 11 to permit the calculation of the derivative components of the net force. Initial accelerations were assumed to be zero. Initial speeds were assumed to be the optimal value. The time step of the algorithm 20 or method 20, analogous to the interval at which each aircraft 11 evaluates the potential field, varied with the geometry of the initial positions and the optimal speed but typically assumed values between 0.5 and 1.2 seconds. Performance of the system 10 and method 20 was evaluated using three primary criteria: separation distance, deviation from path, and capture time. The system 10 and method 20 performed well and as expected.

Thus, a system and computer-implemented algorithm or method for resolving air traffic conflicts in the context of free flight have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A computer-implemented method for resolving air traffic conflicts, said method comprising the steps of:

for each aircraft:
  placing a local goal position in a potential field associated with the aircraft;
  calculating attractive and repulsive forces from the gradient of the potential field;
  calculating a net force using the calculated attractive and repulsive forces;
  calculating initial conditions of a predetermined third-order differential equation that defines the motion of the aircraft;
  integrating the third-order differential equation to compute a velocity vector for the aircraft;
  applying an acceleration constraint to the acceleration vector;
  applying a velocity constraint to the velocity vector;
  applying a turning constraint to the velocity vector;
  calculating a new aircraft position using the constrained velocity vector; and
  removing the local goal position from the potential field.

2. The method of claim 1 wherein the third-order differential equation comprises the equation:

$$a\ d^3\vec{p}/dt^3 + b\ d^3\vec{p}/dt^3 + c\ d^3\vec{p}/dt^3 = \vec{f}$$

where f is the sum of forces, and p is the object position vector, and coefficients a, b, and c are selected to optimize response time.

3. A system for resolving air traffic conflicts, comprising:
  an air traffic control system comprising a computer that implements a predetermined conflict resolution method;
  a radar coupled to the are traffic control system that provides position and velocity information to the air traffic control system for each aircraft in the vicinity of the air traffic control system;
  a communication subnetwork for communicating between aircraft and the air traffic control system; and
  a plurality of aircraft that each comprise a computer that implements the predetermined conflict resolution method, and a data link for transferring position and velocity information between the aircraft and the air traffic control system over the communication subnetwork;
  and wherein the conflict resolution methods employed in each aircraft and in the air traffic control system cooperate to process position and velocity information relating to each aircraft to generate a series of conflict-free maneuvers for each aircraft that optimize the flight path of each respective aircraft toward their respective destinations while eliminating or minimizing the possibility of interference between the aircraft.

4. The system of claim 3 wherein the conflict resolution method comprises the following steps:

for each aircraft:
  placing a local goal position in a potential field associated with the aircraft;
  calculating attractive and repulsive forces from the gradient of the potential field;
  calculating a net force using the calculated attractive and repulsive forces;
  calculating initial conditions of a predetermined third-order differential equation that defines the motion of the aircraft;
  integrating the third-order differential equation to compute a velocity vector for the aircraft;
  applying an acceleration constraint to the acceleration vector;
  applying a velocity constraint to the velocity vector;
  applying a turning constraint to the velocity vector;
  calculating a new aircraft position using the constrained velocity vector; and
  removing the local goal position from the potential field.

5. The system of claim 4 wherein the third-order differential equation comprises the equation:

$$a\ d^3\vec{p}/dt^3 + b\ d^3\vec{p}/dt^3 + c\ d^3\vec{p}/dt^3 = \vec{f}$$

where f is the sum of forces, and p is the object position vector, and coefficients a, b, and c are selected to optimize response time.

* * * * *